(12) United States Patent
Klanner et al.

(10) Patent No.: US 9,823,741 B2
(45) Date of Patent: Nov. 21, 2017

(54) METHOD FOR SELECTING AN INFORMATION SOURCE FOR DISPLAY ON SMART GLASSES

(71) Applicant: Bayerische Motoren Werke Aktiengesellschaft, Munich (DE)

(72) Inventors: Felix Klanner, Singapore (SG); Wolfgang Spiessl, Pfaffenhofen (DE); Martin Enders, Deisenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 14/885,885

(22) Filed: Oct. 16, 2015

(65) Prior Publication Data

US 2016/0041613 A1    Feb. 11, 2016

Related U.S. Application Data

(63) Continuation of application No. PCT/EP2014/057542, filed on Apr. 14, 2014.

(30) Foreign Application Priority Data

Apr. 19, 2013    (DE) .................. 10 2013 207 064

(51) Int. Cl.
  *G09G 5/00*    (2006.01)
  *G06F 3/01*    (2006.01)
  (Continued)

(52) U.S. Cl.
  CPC ......... *G06F 3/012* (2013.01); *G02B 27/0093* (2013.01); *G02B 27/0172* (2013.01);
  (Continued)

(58) Field of Classification Search
  CPC ........ G06F 3/0346; G06F 3/005; G06F 3/012; G06F 3/013; G06F 3/015; G02B 27/0172;
  (Continued)

(56) References Cited

U.S. PATENT DOCUMENTS

4,873,994 A    10/1989    Anger et al.
5,003,300 A     3/1991    Wells
(Continued)

FOREIGN PATENT DOCUMENTS

CA    2 388 766 A1    12/2003
DE    36 10 897 A1    10/1987
(Continued)

OTHER PUBLICATIONS

PCT/EP2014/057541, International Search Report dated Jul. 22, 2014 (Three (3) pages).
(Continued)

*Primary Examiner* — Vijay Shankar
(74) *Attorney, Agent, or Firm* — Crowell & Moring LLP

(57) ABSTRACT

A method for selecting an information source from a plurality of information sources for display on a display of smart glasses is disclosed. In one embodiment, the method includes determining an orientation of the smart glasses with respect to a head of a wearer of the smart glasses, and selecting an information source from the plurality of information sources based at least in part on the determined orientation of the smart glasses with respect to the head of the wearer of the smart glasses.

13 Claims, 1 Drawing Sheet

(51) Int. Cl.
*G06F 3/0346* (2013.01)
*G02B 27/00* (2006.01)
*G02B 27/01* (2006.01)

(52) U.S. Cl.
CPC ...... *G06F 3/0346* (2013.01); *G02B 2027/014* (2013.01); *G02B 2027/0141* (2013.01); *G02B 2027/0178* (2013.01)

(58) Field of Classification Search
CPC .... G02B 2027/0138; G02B 2027/0141; G02B 2027/0178; G02B 2027/014
USPC .......................................... 345/4–9, 156–160
See application file for complete search history.

(56) References Cited

U.S. PATENT DOCUMENTS

| | | | |
|---|---|---|---|
| 5,642,221 A | 6/1997 | Fischer et al. | |
| 5,786,849 A | 7/1998 | Lynde | |
| 7,643,737 B2 | 1/2010 | Kimata et al. | |
| 8,120,857 B2* | 2/2012 | Hedges | A42B 3/04 345/7 |
| 8,184,067 B1 | 5/2012 | Braun et al. | |
| 8,223,024 B1 | 7/2012 | Petrou | |
| 8,629,815 B2* | 1/2014 | Brin | G02B 27/017 345/156 |
| 8,690,750 B2* | 4/2014 | Krueger | A61M 21/00 600/27 |
| 2001/0030630 A1 | 10/2001 | Junk | |
| 2002/0044152 A1 | 4/2002 | Abbott, III et al. | |
| 2010/0091377 A1 | 4/2010 | Hedges et al. | |
| 2011/0080289 A1 | 4/2011 | Minton | |
| 2011/0282130 A1 | 11/2011 | Krueger | |
| 2012/0240077 A1 | 9/2012 | Vaittinen et al. | |
| 2012/0293325 A1 | 11/2012 | Lahcanski et al. | |
| 2013/0038510 A1 | 2/2013 | Brin et al. | |
| 2014/0292642 A1 | 10/2014 | Schubert et al. | |

FOREIGN PATENT DOCUMENTS

| | | |
|---|---|---|
| DE | 198 02 220 A1 | 7/1999 |
| DE | 100 13 478 A1 | 9/2001 |
| DE | 100 18 490 A1 | 11/2001 |
| DE | 10 2004 061 841 A1 | 7/2005 |
| DE | 10 2005 039 703 A1 | 3/2007 |
| DE | 10 2006 004 731 A1 | 8/2007 |
| DE | 10 2007 013 977 A1 | 11/2007 |
| DE | 10 2011 104 524 A1 | 12/2012 |
| EP | 1 182 541 A2 | 2/2002 |
| EP | 1 586 861 A1 | 10/2005 |
| WO | WO 2012/011893 A1 | 1/2012 |

OTHER PUBLICATIONS

German Search Report issued in counterpart DE 10 2013 207 063.2 dated Feb. 17, 2014 with Statement of Relevancy (Five (5) pages).
PCT/EP2014/057542, International Search Report dated Jul. 22, 2014 (Three (3) pages).
German Search Report issued in counterpart DE 10 2013 207 064.0 dated Feb. 28, 2014 with Statement of Relevancy (Five (5) pages).
European Office Action issued in European counterpart application No. 14 716 871.0-1972 dated Jun. 8, 2017 (Eight (8) pages).
Greg Welch et al.: "Motion Tracking: No Silver Bullet, but a Respectable Arsenal", IEEE Computer Graphics and Applications, Dec. 31, 2002, pp. 24-38, XP055373333, URL: http://www.clse.ufl.edu/research/lok/teaching/ve-s09/papers/cqa02_welch_tracking.pdf.

* cited by examiner

METHOD FOR SELECTING AN INFORMATION SOURCE FOR DISPLAY ON SMART GLASSES

CROSS REFERENCE TO RELATED APPLICATIONS

This application is a continuation of PCT International Application No. PCT/EP2014/057542, filed Apr. 14, 2014, which claims priority under 35 U.S.C. §119 from German Patent Application No. 10 2013 207 064.0, filed Apr. 19, 2013, the entire disclosures of which are herein expressly incorporated by reference.

BACKGROUND AND SUMMARY OF THE INVENTION

The invention relates to methods for selecting an information source from a plurality of information sources for display on a display of smart glasses, to a corresponding device and a corresponding computer program.

At present, smart glasses, also sometimes called head-mounted displays, are known which comprise a display. Smart glasses are worn by a user on his head similarly to conventional glasses which are used as a vision aid. In this case, the display of the smart glasses is within the field of view of the wearer. Some smart glasses comprise a display for only one eye, other smart glasses comprise two part-displays, one part-display being allocated to each eye.

It is also known that smart glasses can comprise a semitransparent display. Such a display enables the wearer to recognize both displayed information and the environment behind the display. This type of display is particularly well suited for the contact-analogous representation of information. In contact-analogous representation, a location in the environment of the wearer is allocated to the information to be displayed and the information is displayed allocated to this location, sometimes also called positionally correct display. This can be done by a superimposition, apparent to the wearer, of the information on the allocated location or a representation of the information in spatial vicinity to the allocated location, possibly by means of a symbol such as a line, in order to point to the allocated location. The information itself can also be a symbol, an image, text or similar. The contact-analogous representation is sometimes also called augmented reality.

In addition, smart glasses are also known which comprise a non-transparent display. In these, too, a contact-analogous representation is possible for which purpose a video image or at least a camera image of the environment is made into which the contact-analogous representation is then incorporated, that is to say superimposed on the recorded image in most cases.

Smart glasses have become known, the display of which is not within the central field of view of the wearer. The field of view and the central field of view are defined by the angular range within which people can typically perceive objects within their environment. The angular range is determined starting from the central direction of view when looking straight ahead (the central position of the pupils with respect to the eye sockets). The central field of view lies within an angular range of 10°, 15°, 20° or 25° from the central direction of view when looking straight ahead. Thus, objects of the environment are within the central field of view only when they are located within a conical space of the environment around the central direction of view when looking straight ahead. The field of view which is not within the central field of view is called peripheral field of view.

In comparison with smart glasses having a display within the central field of view, smart glasses, the display of which is not within the central field of view of the wearer, are less suited to representing information contact-analogously. The reason for this is that the attention and perception of the environment of a person during an activity is more oriented towards the central field of view. To this extent, the attention and perception of the environment is thus determined by the orientation of the entire head. It is not possible to change the field of view of the wearer of the smart glasses covered by the display of smart glasses by a different orientation of the head. For this reason, smart glasses, the displays of which are not within the central field of view of the wearer, are less suited to representing information contact-analogously.

It is an object of the invention to extend the use of smart glasses, the displays of which are not within the central field of view of the wearer.

This object may be achieved by the subject matter of the independent claims. Advantageous developments are defined in the dependent claims.

In a first aspect, a method for selecting an information source from a plurality of information sources for display on a display of smart glasses comprises: determining the orientation of the smart glasses with respect to the head of the wearer of the smart glasses; selecting an information source from the plurality of information sources by means of the determined orientation of the smart glasses with respect to the head of the wearer of the smart glasses.

At present, smart glasses are designed to be used always in one orientation with respect to the head, that is to say worn in a wearing attitude or position very similar to that of a vision aid. The invention proposes to use smart glasses in various orientations and in this context to select information sources in dependence on the orientations with respect to the display. In the same way that some wearers of glasses change the position of their conventional vision aid glasses in that they are pushed, for example, from a position in the vicinity of the root of the nose in the direction of the tip of the nose ("pulling down" of the glasses) in order to be able to better perceive certain information in the vicinity (when reading) or conversely in the distance, other information can be made available when pulling down the smart glasses, namely by the selection of another information source. In this context, it is particularly advantageous to select, for the smart glasses pulled down, an information source the information of which is displayed contact-analogously. This may be of advantage, for example, when looking for a particular building, a particular street, a particular person. Changing the position of the smart glasses then corresponds to the effect which is achieved by displacing conventional vision aid glasses: other information becomes available. This analogy provides for an intuitive and easy-to-learn functionality.

The method according to the invention is particularly advantageous in the case of smart glasses, the display of which is not within the central field of view of the wearer. Normally, these smart glasses are not suitable for displaying information contact-analogously. If, however, such smart glasses are shifted in their position, their display can lie at least partially within the central field of view of the wearer. Thus, at least the part lying within the central field of view of the display is suitable for displaying contact-analogous information. The invention now enables this change in the orientation of the smart glasses to be detected and the display to be converted to a contact-analogous representation by choosing a different information source. In this way, the function of a contact-analogous display, which is advantageous in many cases, can be provided for, nevertheless, in smart glasses with a display which is located in the typical (or first) orientation or wearing attitude within the peripheral field of view.

A plurality of information sources can comprise two, three or more information sources. The term "display of the smart glasses" means here the area of the smart glasses in which information can actually be displayed. An information source provides information which is intended to be displayed on a display of a data source. An information source can be a video camera with processing electronics, an on-board computer of a vehicle, a media player or the like. The information sources of the plurality of information sources can be provided by the same computer and can in this case relate to different functions executed by the computer, however.

The orientation with respect to the head of the wearer does not need to specify the complete spatial relation. The determination of the orientation can also comprise only the determination of the inclination of the smart glasses with respect to the head of the wearer.

In one development, the smart glasses comprise a section which is designed to contact the ear and/or the head of the wearer in the area of an ear of the wearer, particularly a temple arm, and wherein this section of the smart glasses comprises sensors which are designed to detect the relative positioning of the section with respect to an ear of the wearer, wherein determining the orientation of the smart glasses comprises: detecting the relative positioning of the section of the smart glasses with respect to an ear of the wearer. Thus, the orientation of the smart glasses can be detected via the contact of the frame of the smart glasses, namely the temple arm of the smart glasses, with the wearer. For this purpose, the smart glasses comprise sensors in the temple arm. If the user changes the orientation of the glasses by pushing them, for example, from a position in the vicinity of the root of the nose in the direction of the tip of the nose ("pulling down" of the glasses), the contact of the temple arm with the ear of the wearer is also displaced in the direction of the free end of the temple arm. Assuming that the smart glasses are still resting on the nose, it is thus possible to infer the new orientation of the smart glasses. In practical use, it occasionally occurs that temple arms of glasses are not resting correctly on the ear of the wearer. In order to guarantee a correct function also in this case, the sensors can be set to be particularly sensitive. Alternatively or additionally, sensors can be provided in both temple arms of the smart glasses so that there are always two measurements available and the contact of one temple arm with one ear is already sufficient for determining orientation. In addition, the wearer and the user of the smart glasses can be provided with a notice that adequate contact of the smart glasses with the ears must be ensured for better detection of the orientation of the glasses and for correct selection of the information source. This can be carried out by the user quite simply by pressing onto the temple arms when changing the orientation of the glasses, that is to say "pulling down" the glasses.

The sensors can be designed to detect at which position the section and the ear of the wearer are in contact, wherein the detecting of the relative positioning of the section of the smart glasses with respect to an ear of the wearer comprises: detecting at which position the section and the ear of the wearer are in contact. For this purpose, sensors can measure the vicinity of body parts with the aid of capacitive effects (similar to the operation of touch screens); similarly, pressure-sensitive sensors can be used. Light-sensitive sensors along the temple arm of the smart glasses which can detect shielding of stray light by the ear would also be conceivable.

In one development, selecting an information source comprises: determining an orientation area from a plurality of orientation areas in which the determined orientation of the smart glasses is located, selecting an information source from the plurality of information sources by means of a predetermined allocation between the orientation areas of the plurality of orientation areas and the information sources of the plurality of information sources; wherein each orientation area from the plurality of orientation areas describes possible orientations of the smart glasses with respect to the head of the wearer, particularly orientations which are successively assumed during a movement of the smart glasses. According to the invention, it is thus made possible to determine the area within which the detected or determined orientation of the smart glasses is located. If, for example, the orientation of the smart glasses is determined by the position of the contact between a section of the temple arm of the smart glasses and the ear, a contact in a first part of the section of the temple arm can always be assigned a first information source, a contact in a second part of the section of the temple arm, in contrast, a second information source. The first and the second part of the temple arm are typically in each case contiguous or continuous, respectively.

In one embodiment, the display of the smart glasses is arranged essentially in a peripheral field of view of the wearer for the wearer of the smart glasses in a first orientation area of the smart glasses with respect to the head of the wearer. At the same time, the display of the smart glasses can be arranged at least with a significant part in a central field of view of the wearer for the wearer of the smart glasses in a second orientation area of the smart glasses with respect to the head of the wearer. In this way, it is made possible according to the invention that smart glasses with displays in the peripheral field of view of the wearer can be used advantageously also for the contact-analogous display of information. A significant part can be more than: 10%, 15%, 20%, 30%, 40%, 50%, 60%, 70%, 80%, 90%.

The smart glasses can comprise a camera which is oriented essentially in the direction of the central direction of view. The recordings of the camera can be used for identifying objects within the field of view of the wearer and for determining their position within the field of view of the wearer so that a contact-analogous representation is made possible. In this context, the orientation of the smart glasses can be taken into consideration, of which, in particular, the inclination of the smart glasses with respect to a horizontal is taken into consideration.

The plurality of information sources can comprise a first information source and a second information source, wherein the first information source provides first information which is not intended for the contact-analogous representation, and wherein the second information source provides second information which is intended for the contact-analogous representation, wherein the method also comprises: determining whether the smart glasses are arranged in the first or the second orientation area; if the smart glasses are arranged in the first orientation area: representing the first information in a non-contact-analogous manner; if the smart glasses are arranged in the second orientation area: representing the second information in a contact-analogous manner. Information which is intended for the contact-analogous representation is allocated to a location in the environment of the wearer of the smart glasses. Their position at which they are displayed in the display of the smart glasses is determined in such a manner that they appear at the correct location to the wearer. Alternatively or additionally, a graphic element can also be displayed positionally correctly and at the same time a graphic connection to the information also displayed can be established. Information which is not provided for the contact-analogous representation is not allocated a location in the environment of the wearer or, respectively, the information should not be displayed with respect to a location in the environment. A first information source can be, for example, a central controller or an on-board computer which outputs as first information the clock time, the date, the speed of the vehicle, the speed of a drive of the vehicle, the power output of the drive of the vehicle or the state of filling of the energy store for the vehicle. A second information source can be, for example, a driver assistance system which outputs as second information the marking (for example a symbol) of another road user with whom a collision is imminent, and the position of the marking in the display of the smart glasses. Similarly, the marking of a lane which is to be traveled on due to a route guidance, and the corresponding position in the display, can be output as second information. As well, a so-called point of interest (POI) and the corresponding position in the display can be output as second information.

The method can also comprise: determining the position in the display of the smart glasses at which the contact-analogous information is to be displayed, by means of the determined orientation of the smart glasses, particularly by using a predetermined allocation between orientations of the smart glasses and a respective reference position in the display of the smart glasses. By means of the reference position in the display, the position of the contact-analogous information (also called the second information previously) in the display of the smart glasses can be determined. Corresponding to the various options of the orientation of the smart glasses, it is appropriate to determine a reference position for each of the orientations or at least to calculate (for example interpolation) on the basis of individual reference positions present. In this way, information can be displayed to the wearer in such a manner that the information appears contact-analogously for the wearer at the correct location in the environment even with different orientations of the smart glasses.

Precisely in order to be able to determine the correct position of information in the display in the case of a contact-analogous representation, it can be provided to perform a calibration sequence initially. In this sequence, markings are represented to the wearer of the smart glasses at various positions in the display and the wearer brings the smart glasses into the orientation in which the marking is displayed positionally correctly (that is to say contact-analogously), possibly by taking note of the orientations possible for him (for example, the smart glasses must always be seated on the nose). For example, ten iterations can be provided for the calibration sequence. If, in using the smart glasses, orientations are later detected which are located between the orientations of the calibration, the relevant parameters can be interpolated (particularly the reference position in the display). In other words, the method can also comprise: executing a calibration sequence for a contact-analogous representation of information in dependence on the orientation of the smart glasses, comprising: for a number of positions of an information item which is to be represented contact-analogously, in the display of the smart glasses: displaying an information item which is to be represented contact-analogously, at the respective position in the display of the smart glasses; detecting the position of the contact of the ear and/or head of the wearer with the section of the smart glasses; recording the position of the contact of the ear and/or head of the wearer with the section of the smart glasses. From the recorded positions, an allocation of orientation areas with respect to reference points can then be generated.

In another aspect, a device comprises smart glasses, means for determining the orientation of the smart glasses with respect to the head of a wearer of the smart glasses, and electronic processing means, the device being arranged to execute one of the preceding methods. Electronic processing means can be, for example, a microcontroller, a computer or dedicated circuits. The means for determining the orientation of the smart glasses can be the aforementioned sensors in the temple arm of the smart glasses. The device can comprise interfaces to the information sources of the plurality of information sources. These interfaces can be wire-connected or wireless and comprise suitable protocols for the data exchange. Such interfaces and protocols are known in the prior art.

In another aspect, a computer program comprises instructions for executing one of the preceding methods. This computer program can comprise instructions which, on execution of the instructions, cause a computer to execute one of the preceding methods.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference symbols relate to corresponding elements in all figures.

DETAILED DESCRIPTION OF THE DRAWINGS

Figure 1:
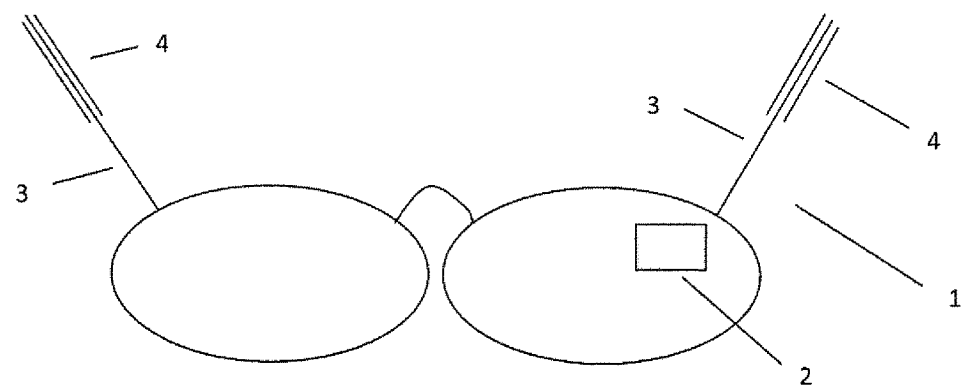
FIG. 1 shows diagrammatically smart glasses with a semitransparent display in a peripheral field of view according to one exemplary embodiment.

FIG. 1 shows diagrammatically smart glasses 1 with a semitransparent display 2 in a peripheral field of view according to one exemplary embodiment. The smart glasses 1 also comprise two temple arms 3. At each end of the temple arms 3, a section is provided which comprises sensors 4 which are designed to discover a contact with a body and its intensity. In the application proposed here, the body part is the ear 5 of the wearer as shown, for example, in FIG. 5. In order to distinguish between a simple resting of the sensor 4 against the head and a contact with the ear, the intensity of the detected contact can be taken into consideration. If the sensor is clamped between ear and head, the body contact is greater. The intensity of the body contact can be determined well particularly via capacitive sensors. The sensors 4 can additionally comprise electronic signal processing means.

Figure 2A:
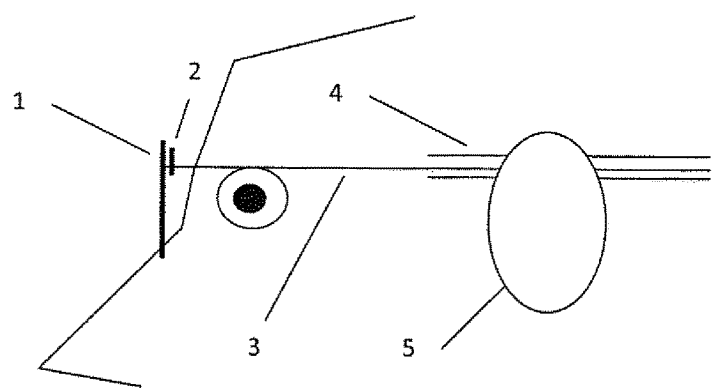
FIG. 2a shows diagrammatically smart glasses in a first orientation according to one exemplary embodiment.

FIG. 2a shows diagrammatically smart glasses 1 in a first orientation according to one exemplary embodiment. The head of the wearer is shown partially and in a side view in FIG. 2a. It should be assumed here that the central field of view of the wearer is such that the display 2 is located in the peripheral field of view. In one orientation, the smart glasses 1 are in the vicinity of the root of the nose. This position is detected via the sensors 4 which discover a body contact with the ear in a first area. In this position, no contact-analogous display of information is available since it would be displayed to the wearer in an area of his field of view which does not bring any great advantages for him. In consequence, general information of a computer is displayed in display 2 such as the clock time and the date and an abstract pictogram for a turning notice of a route guidance.

Figure 2B:
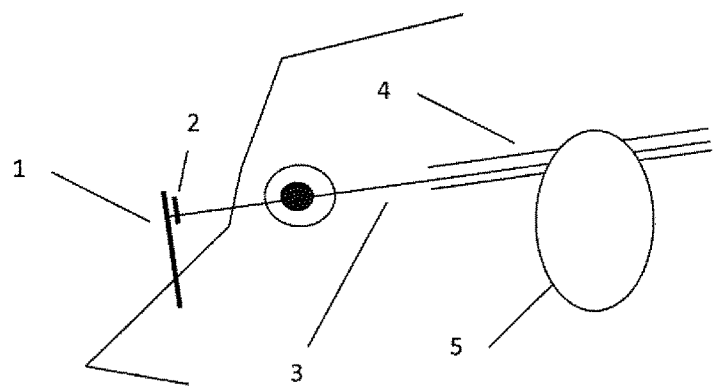
FIG. 2b shows diagrammatically smart glasses in a second orientation according to one exemplary embodiment.

FIG. 2b shows diagrammatically smart glasses 2 in a second orientation according to one exemplary embodiment. The smart glasses 2 are displaced more towards the tip of the nose on the back of the nose. This new orientation is detected by means of the sensors 4. These are now in contact with the ear at a position which is further in the direction of the free end of the temple arm. It is thus found that the contact takes place in another area of the sensor 4. According to an allocation of the new area to another information source, for example a navigation system which provides information intended for the contact-analogous representation, a contact-analogous representation is now carried out. This can be, for example, the positionally correct marking of the street of a confusing intersection into which it is necessary to turn according to a route guidance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for selecting an information source from a plurality of information sources for display on a display of smart glasses, wherein the plurality of information sources comprises a first information which is not intended for a contact-analogous representation and a second information which is intended for the contact-analogous representation, the method comprising:
   determining an orientation area, from a plurality of orientation areas, in which the smart glasses are arranged with respect to a head of a wearer of the smart glasses, wherein the plurality of orientation areas comprises a first orientation area and a second orientation area;
   selecting an information source from the plurality of information sources based at least in part on the determined orientation area of the smart glasses with respect to the head of the wearer of the smart glasses;
   representing the first information in a non-contact-analogous manner if the smart glasses are arranged in the first orientation area; and
   representing the second information in a contact-analogous manner if the smart glasses are arranged in the second orientation area.

2. The method as claimed in claim 1,
   wherein the smart glasses comprise a section which is configured to contact at least one of an ear and the head of the wearer in an area of the ear of the wearer, and wherein said section of the smart glasses comprises sensors which are configured to detect a relative positioning of the section with respect to the ear of the wearer,
   wherein said determining whether the smart glasses are in the first or the second orientation area comprises detecting the relative positioning of the section of the smart glasses with respect to the ear of the wearer.

3. The method as claimed in claim 2,
   wherein the sensors are configured to detect at which position the section and the ear of the wearer are in contact,
   wherein the detecting of the relative positioning of the section of the smart glasses with respect to the ear of the wearer comprises detecting at which position the section and the ear of the wearer are in contact.

4. The method as claimed in claim 1, wherein selecting an information source comprises:
   selecting an information source from the plurality of information sources using a predetermined allocation between each of the plurality of orientation areas and each the plurality of information sources, respectively;
   wherein each of the plurality of orientation areas describes possible orientations of the smart glasses with respect to the head of the wearer, said orientations being successively assumed during a movement of the smart glasses.

5. The method as claimed in claim 2, wherein selecting an information source comprises:
   selecting an information source from the plurality of information sources using a predetermined allocation between each of the plurality of orientation areas and each the plurality of information sources, respectively;
   wherein each of the plurality of orientation areas describes possible orientations of the smart glasses with respect to the head of the wearer, said orientations being successively assumed during a movement of the smart glasses.

6. The method as claimed in claim 3, wherein selecting an information source comprises:
   selecting an information source from the plurality of information sources using a predetermined allocation between each of the plurality of orientation areas and each the plurality of information sources, respectively;
   wherein each of the plurality of orientation areas describes possible orientations of the smart glasses with respect to the head of the wearer, said orientations being successively assumed during a movement of the smart glasses.

7. The method as claimed in claim 1, wherein the display of the smart glasses is arranged essentially in a peripheral field of view of the wearer for the wearer of the smart glasses in the first orientation area of the smart glasses with respect to the head of the wearer.

8. The method as claimed in claim 7, wherein the display of the smart glasses is arranged at least with a significant part in a central field of view of the wearer for the wearer of the smart glasses in the second orientation area of the smart glasses with respect to the head of the wearer.

9. The method as claimed in claim 1, wherein the second information source is a driver assistance system that outputs at least one of: (i) a symbol corresponding to another road user with whom a collision is imminent, along with a position of the symbol in the display of the smart glasses; (ii) a marking of a lane which is to be traveled on due to a route guidance, along with a corresponding position in the display, and (iii) a point of interest, along with a corresponding position in the display.

10. The method as claimed in claim 1, wherein the method further comprises:
   determining a position in the display of the smart glasses at which the contact-analogous information is to be displayed using a predetermined allocation between orientations of the smart glasses and a respective reference position in the display of the smart glasses.

11. The method as claimed in one of claim 2, further comprising:
executing a configuration sequence for a contact-analogous representation of information based on the orientation of the smart glasses, comprising:
for a number of positions of an information item which is to be represented in the contact-analogous manner, in the display of the smart glasses:
displaying an information item which is to be represented contact-analogously, at a respective position in the display of the smart glasses;
detecting a position of contact of the at least one of the ear and the head of the wearer with the section of the smart glasses; and
recording the position of the contact of the at least one of the ear and the head of the wearer with the section of the smart glasses.

12. A device, comprising smart glasses, means for determining the orientation of the smart glasses with respect to the head of a wearer of the smart glasses, and electronic processing means, the device being configured to:
determine an orientation area, from a plurality of orientation areas, in which the smart glasses are arranged with respect to a head of a wearer of the smart glasses, wherein the plurality of orientation areas comprises a first orientation area and a second orientation area,
select an information source from the plurality of information sources based at least in part on the determined orientation area of the smart glasses with respect to the head of the wearer of the smart glasses, wherein the plurality of information sources comprises a first information which is not intended for a contact-analogous representation and a second information which is intended for the contact-analogous representation,
represent the first information in a non-contact-analogous manner if the smart glasses are arranged in the first orientation area, and
represent the second information in a contact-analogous manner if the smart glasses are arranged in the second orientation area.

13. A computer program product comprising a non-transitory processor readable medium having processor executable code embodied therein to select an information source from a plurality of information sources for display on a display of smart glasses, wherein the plurality of information sources comprises a first information which is not intended for a contact-analogous representation and a second information which is intended for the contact-analogous representation, the non-transitory processor readable medium having:
processor executable program code to determine an orientation area, from a plurality of orientation areas, in which the smart glasses are arranged with respect to a head of a wearer of the smart glasses, wherein the plurality of orientation areas comprises a first orientation area and a second orientation area,
processor executable program code to select an information source from the plurality of information sources based at least in part on the determined orientation area of the smart glasses with respect to the head of the wearer of the smart glasses,
processor executable program code to represent the first information in a non-contact-analogous manner if the smart glasses are arranged in the first orientation area, and
processor executable program code to represent the second information in a contact-analogous manner if the smart glasses are arranged in the second orientation area.

* * * * *